Figure 1:
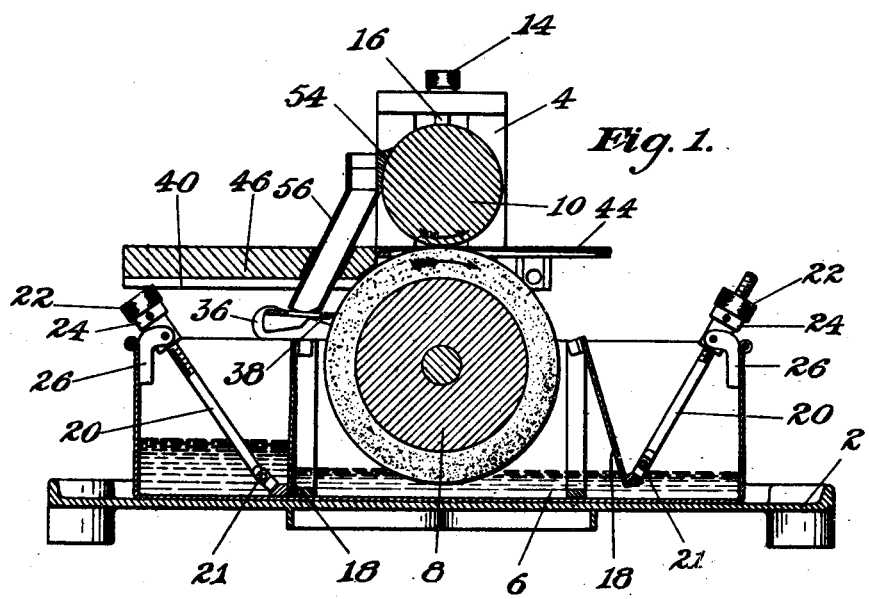

J. J. GILLESPIE.
COATING MACHINE.
APPLICATION FILED MAR. 25, 1907.

1,119,820.

Patented Dec. 8, 1914.
2 SHEETS—SHEET 1.

Witnesses.
Elizabeth C. Coupe
Bertha M. Hutchinson

Inventor.
John J. Gillespie
By his Attorney,
Nelson W. Howard

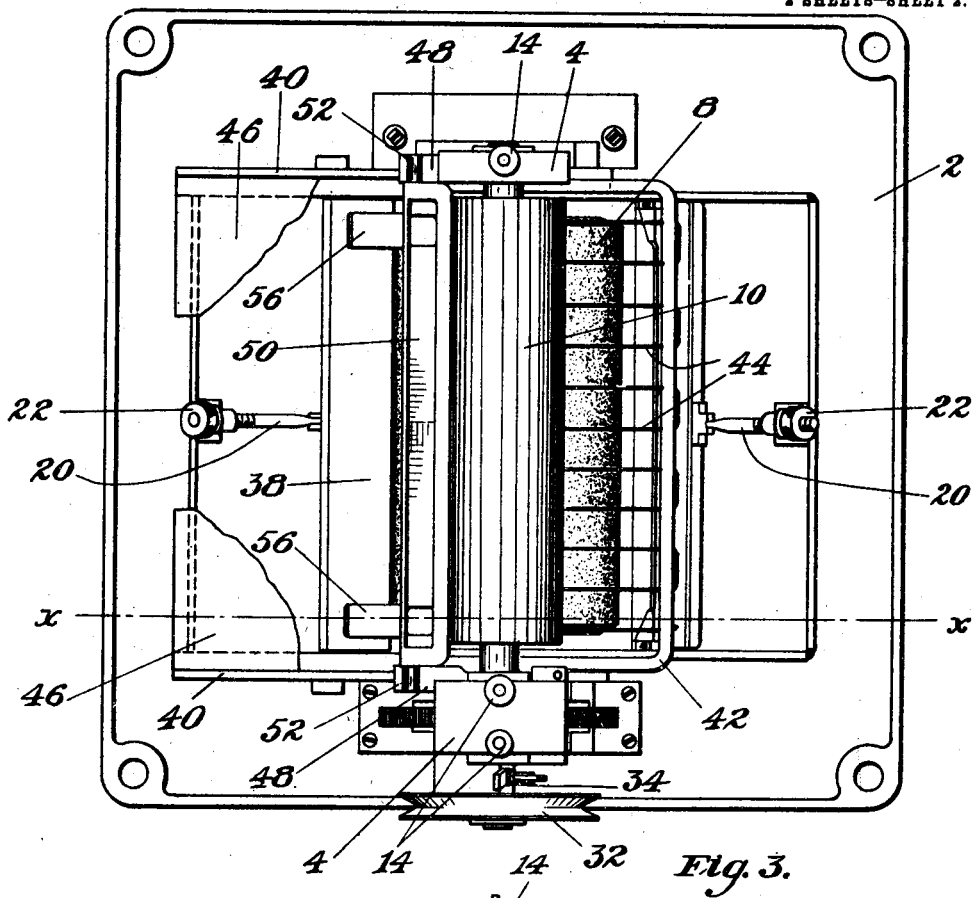
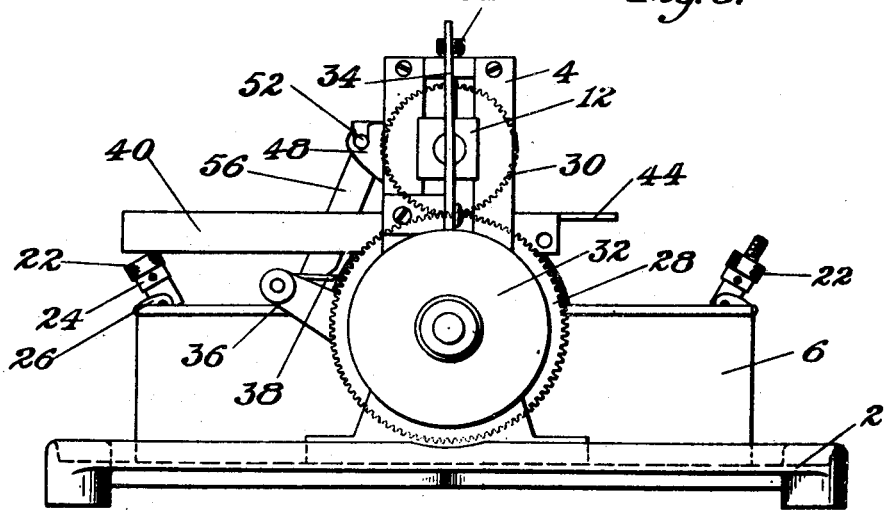

UNITED STATES PATENT OFFICE.

JOHN J. GILLESPIE, OF BOSTON, MASSACHUSETTS, ASSIGNOR TO UNITED SHOE MACHINERY COMPANY, OF PATERSON, NEW JERSEY, A CORPORATION OF NEW JERSEY.

COATING-MACHINE.

1,119,820. Specification of Letters Patent. Patented Dec. 8, 1914.

Application filed March 25, 1907. Serial No. 364,490.

*To all whom it may concern:*

Be it known that I, JOHN J. GILLESPIE, a citizen of the United States, residing at Boston, in the county of Suffolk and Commonwealth of Massachusetts, have invented certain Improvements in Coating-Machines, of which the following description, in connection with the accompanying drawings, is a specification, like reference characters on the drawings indicating like parts in the several figures.

This invention relates to machines for coating material and particularly for coating parts of shoes such as linings for vamps with cement. By the term cement is meant any material of a cementitious nature such as ordinary cement, paste or other adhesive substance.

In the manufacture of shoes it is found desirable to stick together certain parts such as vamps and vamp-linings in order that these parts may be kept in accurate position relatively to each other during the assembling and stitching operations. It is customary to coat linings such as vamp-linings with cement on one side and then place the lining in the proper position upon the vamp or other part with the coated side in contact therewith. Difficulty is sometimes experienced in getting the proper amount of cement upon the lining and also in applying it in a uniform manner. If too much cement is applied, the lining is apt to pucker unless great care is taken to smooth it down upon the part to which it is cemented. Furthermore, when too much cement is applied, it will get on the fingers of the operator and will smear portions of the shoe which it is particularly desirable to keep clean. On the other hand if an insufficient quantity of cement is applied the parts will not adhere to each other. If the cement is not applied uniformly the lining is apt to stick in spots only and become wrinkled. An objection which is encountered when the cement is applied by machines is due to the fact that the lining in its passage through the machine becomes smeared on the side which it is desired to keep clean. This defect may exist even though the cement is properly applied to the side which is to be coated. Still another defect which exists when machines are used lies in the fact that the lining tends to cling to the applying means at the time when it is desired that the lining shall be fed away therefrom.

An object of this invention is to provide a machine which will apply cement to one side of the material which it is desired to coat without liability of the material clinging to the applying means.

Another object of the invention is to provide a machine in which a sufficient quantity of cement will be applied to the material without liability of applying an excessive amount.

A further object of the invention is so to construct the machine that smearing of the material with cement upon the portion which it is desired to leave uncoated is prevented.

One of these objects is accomplished by constructing a machine which has a receptacle for cement divided into compartments by one or more partitions, and which has applying means associated with one of the compartments. The applying means may consist conveniently of a roller rotatably mounted in one compartment. This compartment is connected with the other compartments in which the cement is placed by adjustable passageways. By adjusting the passageways the flow of cement to the applying means may be so controlled that said means will take up approximately the proper amount of cement to give the desired coating. It is preferable, however, so to adjust the passageways that the applying-roller will take up slightly more cement than is desired and then to remove this slight excess by means of a scraper or doctor before the said roller comes into contact with the material to be coated. Means consisting preferably of a pressure-roller may be provided to press the material into contact with the applying means and thereby assist in obtaining a uniform coating on the material. Means to prevent the material from being smeared on the side which it is desired to leave uncoated is preferably associated with the pressing means. A convenient construction for this purpose consists of a trough having a scraping edge in contact with the pressure-roller. Means for guiding the material to the applying means may be provided. The said guiding means is preferably so arranged as to extend in substantially the same plane as the means for preventing the material from clinging to the applying means.

The means for preventing the material from clinging to the applying-roller consists preferably of a frame having relatively small wires stretched across it at intervals from side to side. This frame is secured to the machine in such manner that the wires extend between the pressure-roller and the applying-roller with the wires in contact with and practically embedded in the felt with which the applying-roller may be covered. Since the material when it passes through the machine has the pressure-roller on one side and the applying-roller and wires on the other side it will be seen that not only will the material be prevented from clinging to the applying-roller but that the wires will not interfere with coating the material on substantially the whole surface which is adjacent to the applying-roller. In order that the material may be fed expeditiously a table is preferably supported at the front of the machine abutting against the frame for the wires and extending in the same plane therewith.

Figure 2:
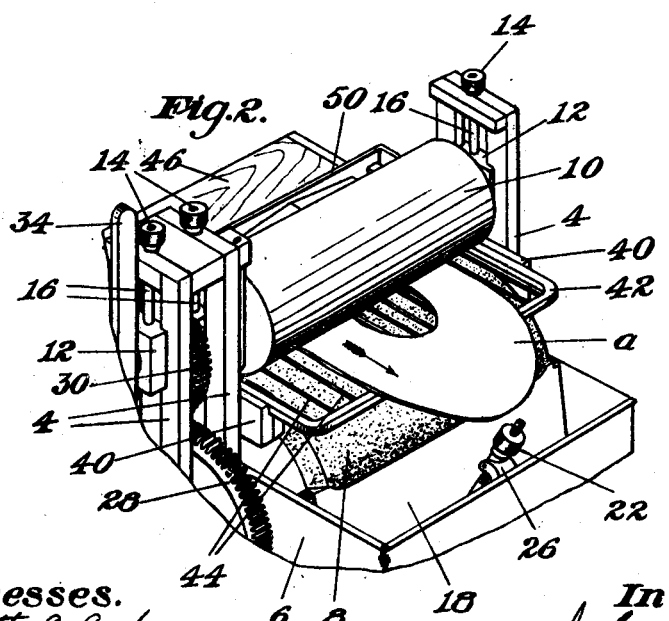

Referring to the drawings, Figure 1 is a sectional view of the machine on the line x—x, Fig. 3; Fig. 2 is a view in perspective of the upper portion of the machine; Fig. 3 is a top plan view; and Fig. 4 is a view in elevation of the right-hand end of the machine.

A base plate 2 carries standards 4, 4. Upon the base plate and between said standards is a receptacle or tank 6. An applying-roller 8 which is preferably covered with felt is mounted in bearings on the standards. This roller is mounted to rotate within said receptacle with its lower portion a slight distance above the bottom of the receptacle. Above the applying-roller is a pressure-roller 10. These two rollers are so mounted as to be relatively adjustable. As shown in the drawings the shaft of the pressure-roller is mounted in bearings 12 which are so supported on the standards 4, 4 as to be vertically slidable. The amount of separation between the two rollers is regulated by the thumb nuts 14 which screw upon the upper ends of bolts 16 which are secured at their lower ends to the said bearings.

The receptacle is divided into compartments, there being three as shown. The compartments are formed by partitions 18 hinged at their upper ends to the receptacle. Rods 20 are secured to the lower ends of the partitions by means of joints 21. The upper ends of these rods are screw-threaded, and thumb-nuts 22 which engage the screw threads are rotatably secured to sleeves 24 pivoted to brackets 26 secured to the receptacle. The nuts are prevented from longitudinal movement by the said sleeves and hence by turning the nuts the rods may be raised or lowered as desired and the partitions opened to any desired extent or entirely closed.

The shafts of the applying-roller and the pressure-roller have intermeshing gears 28 and 30 while the shaft of the applying-roller also has a driving-pulley 32. This pulley is loose on the shaft and may be connected thereto when desired by a clutch 34. The teeth of the intermeshing gears are made sufficiently long to be kept in mesh when the pressure-roller is adjusted to the highest position desired.

The standards 4, 4 have brackets 36 which carry a scraper or doctor 38 to remove surplus cement from the applying-roller. Secured to the standards above said brackets are rabbeted supports 40. To these supports is secured a rectangular frame 42 having wires 44 stretched across it at intervals between the two rollers. A board or table 46 rests upon the supports 40, the rear edge of said table abutting against the front edge of the rectangular frame 42. The upper surface of said table lies in the same plane as the wires 44 and is substantially level with the uppermost portion of the applying-roller, as shown in Fig. 1.

Toward the upper ends of the standards are the hangers 48 which support a trough 50 having reduced ends 52 to fit into slots in the hangers. The trough has a scraping edge 54 and the bottom of the trough is preferably inclined downwardly from the center toward each end, and secured to each end is a conduit 56 which leads to the receptacle 6. The table 46 and the doctor 38 are provided with apertures for the conduits which preferably terminate on about the level of the doctor.

The machine may be taken apart readily for cleaning or other purposes since the parts are removably secured. The trough with attached conduits is removably supported in the hangers 48 while the frame for the wire is removably supported upon the rabbeted support 40 as is also the table. The standards are bolted to the base and by loosening them, the applying-roller and the pressure-roller may be removed.

The operation of the machine is as follows: The operator places cement in either or both of the outside compartments of the receptacle and adjusts the partitions 18 to permit a slow flow of cement into the middle compartment which contains the applying-roller. The flow is preferably so regulated that the lower portion of said roller extends for but a slight distance into the cement. The roller therefore does not carry up a large excess of cement and the amount carried up will always be the same for a particular quantity of cement regardless of the depth of the same in the outer compartments. It is intended that the applying-roller shall take up slightly more cement than is needed and this slight excess is removed by the doctor 38. The pressure-roller 10 is preferably adjusted by turning the thumb-nuts 14 if this has not already been done. This roller is preferably of brass or similar composition, and is made very smooth. It is therefore possible to adjust it so as to bring it very close to the applying-roller without bringing it into actual contact therewith. Cement is not liable therefore to get on the pressure-roller, but if it does it is quickly removed by the scraping edge 54 from which it flows into the trough and then back to the receptacle through the conduits. Smearing of the material upon the upper surface is thus prevented since if any cement gets upon the roller 10 it is removed before the roller comes into contact with the material. When the operator is ready to commence coating the material, he throws in the clutch and presents the pieces to be coated, one at a time, so that the edge comes between the pressure and applying-rollers which rotate in the direction indicated by the arrows in Fig. 1 and act as feed-rollers to cause the material to pass between them. As the material which is designated by the character a in Fig. 2 passes between the rollers in the direction indicated by the arrow in said figure, it is coated uniformly upon the lower side by contact with the applying-roller and is prevented from clinging to the same by the wire which is stretched across the frame 42. The pieces to be coated may be piled within easy reach of the operator when standing in front of the machine. He picks them up one at a time and places them upon the table upon which they are guided to the rollers. The individual members of the wire are sufficiently small to be practically embedded in the felt of the applying-roller and hence no portion of the lower surface of the material is left uncoated.

As has been stated above, the position of the pressure roller 10 may be varied by turning the nuts 14. In the use of the machine these nuts are turned until the effective portion of the pressure roll is at a distance from the plane of the wires equal approximately to the thickness of the vamp which is to be cemented, so that the vamp lies flat during its passage through the machine.

Having described my invention, what I claim as new and desire to secure by Letters Patent of the United States is:—

1. A machine of the class described having in combination a cement applying roll, means for supplying cement thereto, a pressure roll, a presenting table having its upper surface in a plane extending between the surfaces of said rolls, a frame comprising a plurality of wires located in said plane, and a guideway in which said table and frame are slidable.

2. In a machine of the class described, the combination with a receptacle for cement, of a partition hinged at its upper end to the walls of said receptacle and dividing said receptacle into two compartments, a rod pivoted to the lower end of said partition and means for adjusting said rod.

In testimony whereof I have signed my name to this specification in the presence of two subscribing witnesses.

JOHN J. GILLESPIE.

Witnesses:
EDITH C. HOLBROOK,
ANNA C. BRIER.